(12) United States Patent
Franklin et al.

(10) Patent No.: US 6,869,006 B2
(45) Date of Patent: Mar. 22, 2005

(54) AMPLITUDE MEASUREMENT FOR AN ULTRASONIC HORN

(75) Inventors: Kent A. Franklin, Appleton, WI (US); Thomas D. Ehlert, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/609,318

(22) Filed: Jun. 27, 2003

(65) Prior Publication Data

US 2004/0004106 A1 Jan. 8, 2004

Related U.S. Application Data

(60) Division of application No. 09/651,920, filed on Aug. 31, 2000, now Pat. No. 6,628,408, which is a continuation-in-part of application No. 09/292,194, filed on Apr. 15, 1999, now abandoned.

(51) Int. Cl.$^7$ ................................................. B23K 1/06
(52) U.S. Cl. ............................ 228/1.1; 228/9; 228/103; 73/1.82
(58) Field of Search ............................... 228/1.1, 110.1, 228/102, 103, 104, 8; 156/73.1, 73.2, 73.3, 73.4, 580.1, 580.2; 73/1.82, 1.84

(56) References Cited

U.S. PATENT DOCUMENTS

| | | | |
|---|---|---|---|
| 3,918,816 A | | 11/1975 | Foster et al. |
| 4,040,885 A | * | 8/1977 | Hight et al. ............. 156/378 |
| 4,046,477 A | | 9/1977 | Kaule |
| 4,053,227 A | | 10/1977 | Bodlaj |
| 4,060,329 A | | 11/1977 | Ellis |
| 4,086,808 A | | 5/1978 | Camac et al. |
| 4,121,470 A | | 10/1978 | Kaule |
| 4,129,041 A | | 12/1978 | Bickel |
| 4,180,324 A | | 12/1979 | Primbsch |

(List continued on next page.)

FOREIGN PATENT DOCUMENTS

| | | | |
|---|---|---|---|
| CA | 2302891 A1 | * | 10/2000 |
| JP | 61-022641 | * | 1/1986 |
| JP | 07339494 | | 12/1995 |
| JP | 2004-079969 | * | 3/2004 |

OTHER PUBLICATIONS

*The Authority On Displacement Measuring*, company brochure, Micro–Epsilon, Raleigh, North Carolina, Apr. 1998.

*Noncontact Position Measuring Systems*, company brochure, Kaman Instrumentation Corporation, Colorado Springs, Colorado, Aug. 1990.

MTI–2000 Fotonic™ Sensor Instruction Manual, MTI Instruments, Mechanical Technology Inc., Latham, New York, Revised Mar. 1991.

KD–LS–IA Operating Instruction Manual, Mechanical Technology Inc., Instruments Division, Latham, New York. Website: mtiinstruments.com.

Primary Examiner—Kiley S. Stoner
(74) Attorney, Agent, or Firm—Pauley Petersen & Erickson

(57) ABSTRACT

A method and system for directly measuring and controlling the amplitude of an ultrasonic horn comprising an ultrasonic horn, a non-contact measurement device for directly measuring an amplitude of the ultrasonic horn, and a controller for modulating the amplitude of the ultrasonic horn in communication with the non-contact measurement device. In accordance with the noncontact optical detection embodiments, the non-contact measurement device is an optical system in which one of a coherent or noncoherent light beam is transmitted from a light source onto a surface of the ultrasonic horn, generating reflected light at a photodetector. The photodetector produces an output signal proportional to at least one of the intensity or the location of the light spot. Detector output is then correlated to the amplitude of the ultrasonic horn and input to a controller for controlling the amplitude of the ultrasonic horn in real time.

21 Claims, 8 Drawing Sheets

U.S. PATENT DOCUMENTS

| | | | |
|---|---|---|---|
| 4,275,963 A | 6/1981 | Primbsch | |
| 4,345,475 A | 8/1982 | Bickel | |
| 4,381,676 A | 5/1983 | Kaule et al. | |
| 4,388,832 A | 6/1983 | Kaule | |
| 4,566,225 A | 1/1986 | Bizot et al. | |
| 4,567,769 A | 2/1986 | Barkhoudarian | |
| 4,619,529 A | 10/1986 | Iuchi et al. | |
| 4,659,224 A | 4/1987 | Monchalin | |
| 4,713,132 A | 12/1987 | Abel et al. | |
| 5,025,665 A | 6/1991 | Keyes, IV et al. | |
| 5,431,324 A * | 7/1995 | Kajiwara et al. | 228/102 |
| 5,440,914 A | 8/1995 | Tachibana et al. | |
| 5,585,921 A * | 12/1996 | Pepper et al. | 356/487 |
| 5,587,051 A | 12/1996 | Ostermayer et al. | |
| 5,591,288 A | 1/1997 | Becker et al. | |
| 5,591,298 A | 1/1997 | Goodman et al. | |
| 5,684,578 A | 11/1997 | Nower et al. | |
| 5,684,596 A | 11/1997 | Eslinger et al. | |
| 5,705,810 A | 1/1998 | Wang et al. | |
| 5,726,366 A | 3/1998 | Washio et al. | |
| 5,817,199 A | 10/1998 | Brennecke et al. | |
| 6,181,431 B1 * | 1/2001 | Siu | 356/502 |
| 6,628,408 B1 * | 9/2003 | Franklin et al. | 356/623 |
| 2004/0004106 A1 * | 1/2004 | Franklin et al. | 228/1.1 |

* cited by examiner

AMPLITUDE MEASUREMENT FOR AN ULTRASONIC HORN

This application is a Divisional of Ser. No. 09/651,920, filed on 31 Aug. 2000 now U.S. Pat. No. 6,628,408, which is a continuation-in-part of Ser. No. 09/292,194 filed Apr. 15, 1999, now abandoned.

BACKGROUND OF THE INVENTION

1. Field of the Invention

This invention relates to ultrasonic horns for ultrasonic bonding of materials such as composite multiple-layer webs, and in particular, a method and system for directly measuring and controlling the amplitude of an ultrasonic horn during processing of the material being bonded.

2. Description of Prior Art

Ultrasonic bonders are known in the art. See, for example, U.S. Pat. No. 4,713,132 to Abel et al. which teaches a method and apparatus for ultrasonic bonding of a moving web, and U.S. Pat. No. 5,591,298 to Goodman et al. which teaches a machine for ultrasonic bonding utilizing a stationary ultrasonic horn. Stationary ultrasonic horn bonders are limited to operating on webs traveling at low speeds, in part, because, at higher web speeds, the web being bonded tends to pile up, or bunch up, at the leading edge of the stationary ultrasonic horn. In addition, the amplitude of a stationary ultrasonic horn during normal production of ultrasonically bonded materials is normally controllable only indirectly. Certain problems associated with material handling by stationary ultrasonic horn bonding equipment are addressed by U.S. Pat. No. 5,817,199 to Brennecke et al. which teaches the use of a rotating ultrasonic horn in combination with an anvil roll to ultrasonically bond web materials together. However, no method for directly controlling the amplitude of either a stationary or rotating ultrasonic horn during ultrasonic bonding of the web material is taught or suggested by the prior art known to me.

The use of light as a means for measuring the physical attributes of various types of objects is well known to those skilled in the art. For example, U.S. Pat. No. 4,046,477 to Kaule teaches an interferometric method and apparatus for sensing surface deformation of a workpiece subjected to acoustic energy in which the surface of the workpiece is illuminated by a laser beam which is reflected therefrom and passed through an optical beam splitter to produce a measuring beam portion and a reference beam portion. The measuring beam portion after reflection at a mirror is transmitted to photoelectric means while the reference beam portion is time delayed by means of an optical delay path and then brought to interfere with the measuring beam portion at the photoelectric means.

U.S. Pat. No. 3,918,816 to Foster et al. teaches a method and apparatus for dimensional inspection of a tire involving mounting of the tire for rotation and impinging on its tread surface a laser beam, analyzing the backscattered radiation to determine the position in space of the point of impingement, and selectably scanning or positioning the laser to measure various positions on the tire surface.

U.S. Pat. No. 4,086,808 to Camac et al. teaches a method and apparatus for measuring and monitoring vibrational or similar motion in mechanical elements in which retroreflectors on the elements are illuminated with monochromatic light, such as a laser, and the reflected beams form an interference pattern. Shifts in the interference fringes correspond to motion which changes the relative length of the paths of reflected light, and these shifts are counted or analyzed to monitor such motion.

U.S. Pat. No. 4,659,224 to Monchalin teaches the use of a laser beam and an interferometer of the confocal Fabry-Perot type for non-contact reception of ultrasonic waves wherein the interferometer detects the frequency shift caused by the Doppler effect in an incident layer beam as a result of ultrasonic deformations of a workpiece.

U.S. Pat. No. 4,619,529 to Iuchi et al. teaches an interferometric contact-free measuring method for sensing, by a laser beam, motional surface deformation of a workpiece subject to an ultrasonic vibration in which the laser beam is split into a measuring beam incident upon a measuring point on the workpiece and a reference beam incident upon a reference point close to the measuring point, and the two beams, after reflection, are brought into a common optical detector.

SUMMARY OF THE INVENTION

It is one object of this invention to provide a method for measuring the amplitude of stationary and rotating ultrasonic horns.

It is another object of this invention to provide a method for measuring the amplitude of stationary and rotating ultrasonic horns during production of an ultrasonically bonded web material.

It is a further object of this invention to provide a system for directly controlling the amplitude of stationary and rotating ultrasonic horns during ultrasonic bonding of a web material.

These and other objects of this invention are addressed by a system for directly controlling the amplitude of an ultrasonic horn comprising an ultrasonic horn, non-contact measurement means for directly measuring an amplitude of the ultrasonic horn, and control means for modulating the amplitude of the ultrasonic horn in communication with the non-contact measurement means. In accordance with one preferred embodiment of this invention, the non-contact measurement means comprises a non-contact amplitude sensor and a data acquisition and analysis system, which data acquisition and analysis system is operatively connected to the non-contact amplitude sensor and determines the amplitude of the ultrasonic horn.

A method for directly controlling the amplitude of an ultrasonic horn in accordance with this invention comprises the steps of detecting the surface motion of an ultrasonic horn with a non-contact amplitude sensor resulting in generation of a signal corresponding to said surface motion, transmitting said signal to a data acquisition and analysis system in which the signal is processed, resulting in a determination of the amplitude of the ultrasonic horn, transmitting said amplitude determination to an ultrasonic horn controller, and adjusting the amplitude of the ultrasonic horn to a desired level. In accordance with one preferred embodiment, the amplitude sensor is a high intensity light source from which a high intensity light beam is transmitted onto a surface of an ultrasonic horn, thereby generating a plurality of reflected light beams. A portion of the reflected light beams is passed through a lens, forming a light spot which is projected onto a detector. The detector produces an output signal proportional to the strength of the light spot and the location of the light spot on the detector. The displacement of the light spot on the detector is then determined. This displacement corresponds to the amplitude of the ultrasonic horn. In accordance with one particularly preferred embodiment, the ultrasonic horn is a rotating ultrasonic horn and the light source is disposed perpendicular to the axis of the rotation of the rotating ultrasonic horn.

A system for ultrasonic bonding in accordance with this invention comprises an ultrasonic horn in contact with a material to be bonded and non-contact means for measuring the amplitude of the ultrasonic horn. In accordance with one embodiment of this invention, the non-contact means comprises a light source which transmits a high intensity light beam onto a surface of the ultrasonic horn. A lens is positioned to receive a portion of the plurality of reflected light beams reflected off the surface and to project the portion of the plurality of reflected light beams as a light spot onto a detector positioned to detect the light spot. The detector produces an output signal proportional to the strength and location of the light spot on the detector. Translation means are provided for converting the displacement of the light spot on the detector into an actual horn displacement. In accordance with a preferred embodiment, the ultrasonic horn is a rotating ultrasonic horn and the light source is disposed perpendicular to the axis of rotation of the rotating ultrasonic horn.

In accordance with one embodiment of this invention, the non-contact amplitude sensor is another optical displacement sensor, of the fiber optic displacement sensor type, using a high intensity light beam, generally of non-coherent light, which relies on a change of the field of the emitter light beam as reflected off the moving, or displaced, surface of the horn to change the intensity of light received at the photodetector. Such fiber optic displacement sensors are commercially available, as from Mechanical Technology Inc. of Albany, N.Y.

In accordance with one embodiment of this invention, the non-contact amplitude sensor is a non-contact displacement measuring device employing an eddy current principle. In accordance with another embodiment of this invention, the noncontact amplitude sensor is a non-contact inductive measuring device. In accordance with yet another embodiment, the non-contact amplitude sensor is a non-contact capacitive displacement measuring device.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Until the method of this invention, measuring the amplitude of an ultrasonic horn used in the ultrasonic bonding of web materials required the horn to be stationary because the sensors used to measure rotating ultrasonic horn amplitude needed to be closer to the surface of the horn than the run-out of the horn. Run-out is described as the change in position of the rotational axis of the horn. Thus, in order to avoid contact between the sensors and the rotating ultrasonic horn due to the run-out of the horn, the sensors were required to be placed at a sufficient distance from the horn, which distance was out of the workable range of the sensors. In addition, closeness of the sensors to the horn is also a safety consideration because the sensors could be destroyed in the event of a material processing problem which results in the material being bonded becoming wrapped around the horn. As a result, only indirect control of the ultrasonic horn amplitude during normal operation was possible. Using the method of this invention, direct measurements of ultrasonic horn amplitude are possible during the bonding process, thereby enabling real-time, direct control of the ultrasonic horn amplitude. Because ultrasonic horn amplitude is one of the critical process settings for determining bond strength, the method of this invention enables a reduction in bond strength variability normally occurring during the bonding process.

A system for directly controlling the amplitude of an ultrasonic horn in accordance with this invention comprises an ultrasonic horn, non-contact measurement means for directly measuring an amplitude of the ultrasonic horn, and control means for modulating the amplitude of the ultrasonic horn in communication with the non-contact measurement means. In accordance with one preferred embodiment of this invention, the non-contact measurement means comprises a noncontact amplitude sensor and a data acquisition and analysis system, which data acquisition and analysis system is operatively connected to the non-contact amplitude sensor and determines the amplitude of the ultrasonic horn.

Figure 1:
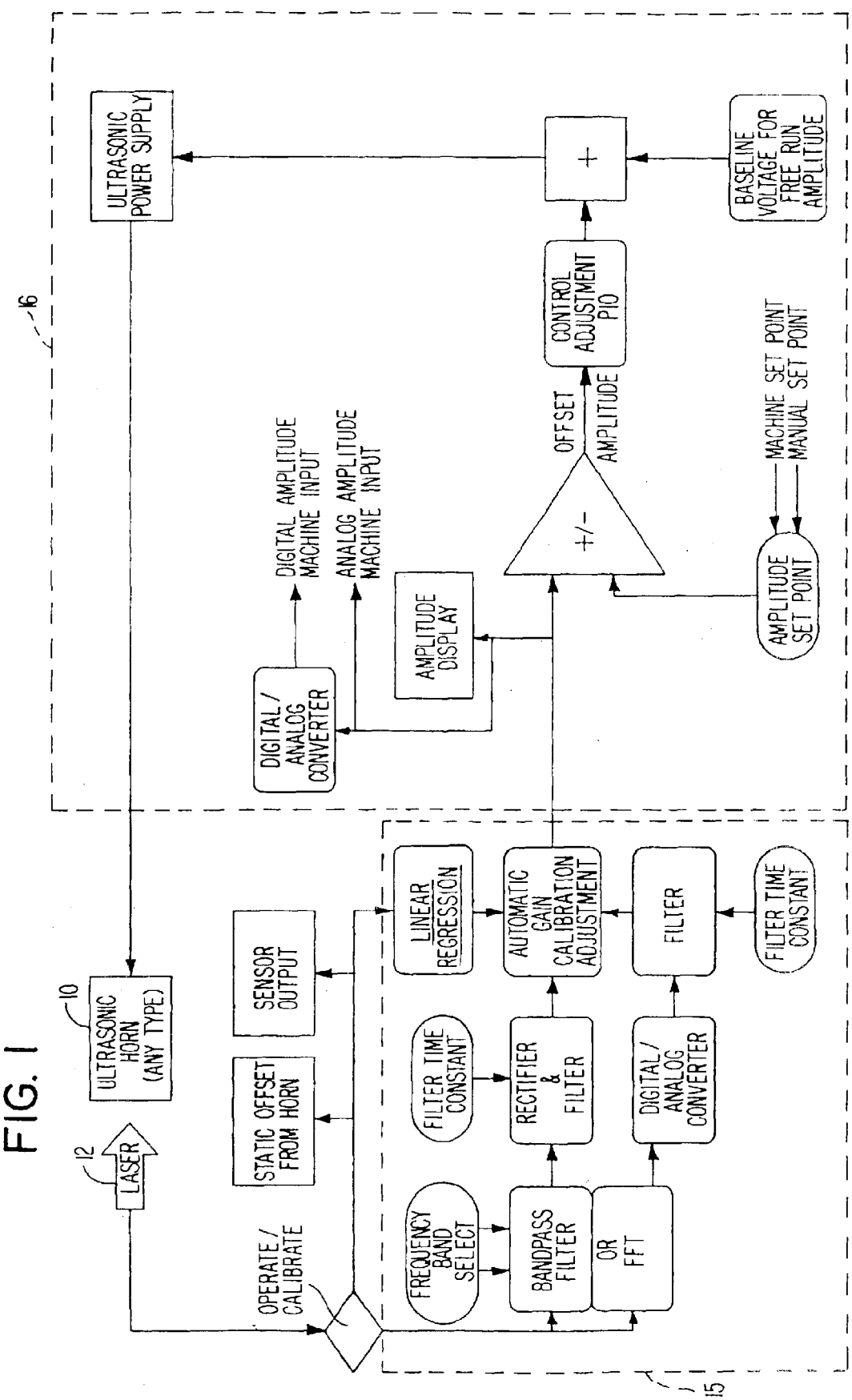
FIG. 1 is a diagram of an ultrasonic amplitude control system in accordance with one preferred embodiment of this invention.

FIG. 1 is a diagram showing details of an ultrasonic amplitude control system in accordance with one preferred embodiment of this invention. In accordance with the embodiment shown in FIG. 1, the non-contact amplitude sensor is a laser system 12 employing optical triangulation as discussed hereinbelow. Other suitable non-contact amplitude sensors are discussed hereinbelow. The data acquisition and analysis of the signals generated by the non-contact amplitude sensor in the form of position sensitive detectors are performed by the components shown within the box designated by reference numeral 15 while amplitude control is performed by the components shown within the box designated by reference numeral 16. As shown, the amplitude control system 16 comprises an amplitude display, for example a CRT, which enables an operator to view the amplitude of an ultrasonic horn in real time and make adjustments accordingly. The functions of boxes 15 and 16 may be analog, digital, or a combination thereof.

Figure 2:
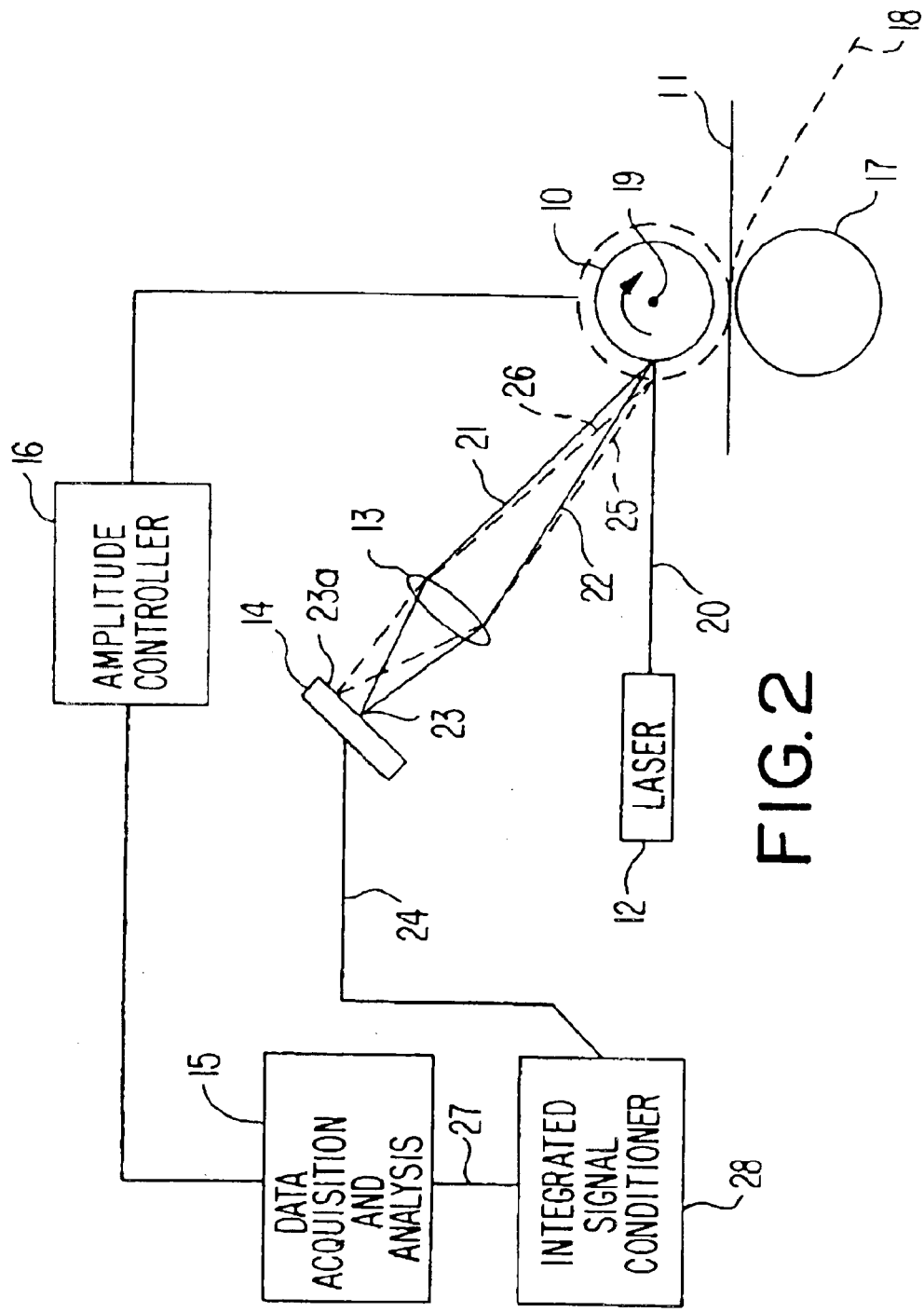
FIG. 2 is a schematic diagram of a system for ultrasonic bonding employing the method for measuring the amplitude of a rotating ultrasonic horn in accordance with one embodiment of this invention.

FIG. 2 is a diagram of a system for ultrasonic bonding of two web materials 11, 18 in accordance with one embodiment of this invention. The system comprises rotating ultrasonic horn 10 in contact with the material 11, 18 to be bonded and a non-contact means for measuring the amplitude of rotating ultrasonic horn 10.

Said non-contact means comprises a light source 12 disposed perpendicular to the axis of rotation 19 of rotating ultrasonic horn 10. Light source 12 transmits a high intensity light beam 20 onto a material contacting surface of rotating ultrasonic horn 10. Lens 13 is positioned to receive a portion of a plurality of reflected light beams 21, 22 reflected off the material contacting surface of rotating ultrasonic horn 10 and to project said portion of said plurality of reflected light beams as a light spot 23 onto a detector 14 positioned to detect light spot 23. Detector 14 produces signal 24 proportional to the strength and location of light spot 23 on the detector. Integrated circuitry conditions signal 24 and transmits output signal 27 to a data acquisition and analysis system 15 comprising translation means for determining the displacement of light spot 23 on detector 14. Upon receipt of the output signal 27 from integrated signal conditioner 28, data acquisition and analysis system 15 determines the displacement of the light spot 23 and converts the displacement to the actual amplitude of rotating ultrasonic horn 10. Given the ability to determine the amplitude of rotating ultrasonic horn 10 during processing of material webs 11, 18, the amplitude of rotating ultrasonic horn 10 can be directly regulated by amplitude controller 16 operably connected to rotating ultrasonic horn 10.

In accordance with another embodiment of this invention, the system for ultrasonic bonding of two web materials is substantially as shown in FIG. 2 except that rotating ultrasonic horn 10 is replaced by a stationary ultrasonic horn.

Figure 3:
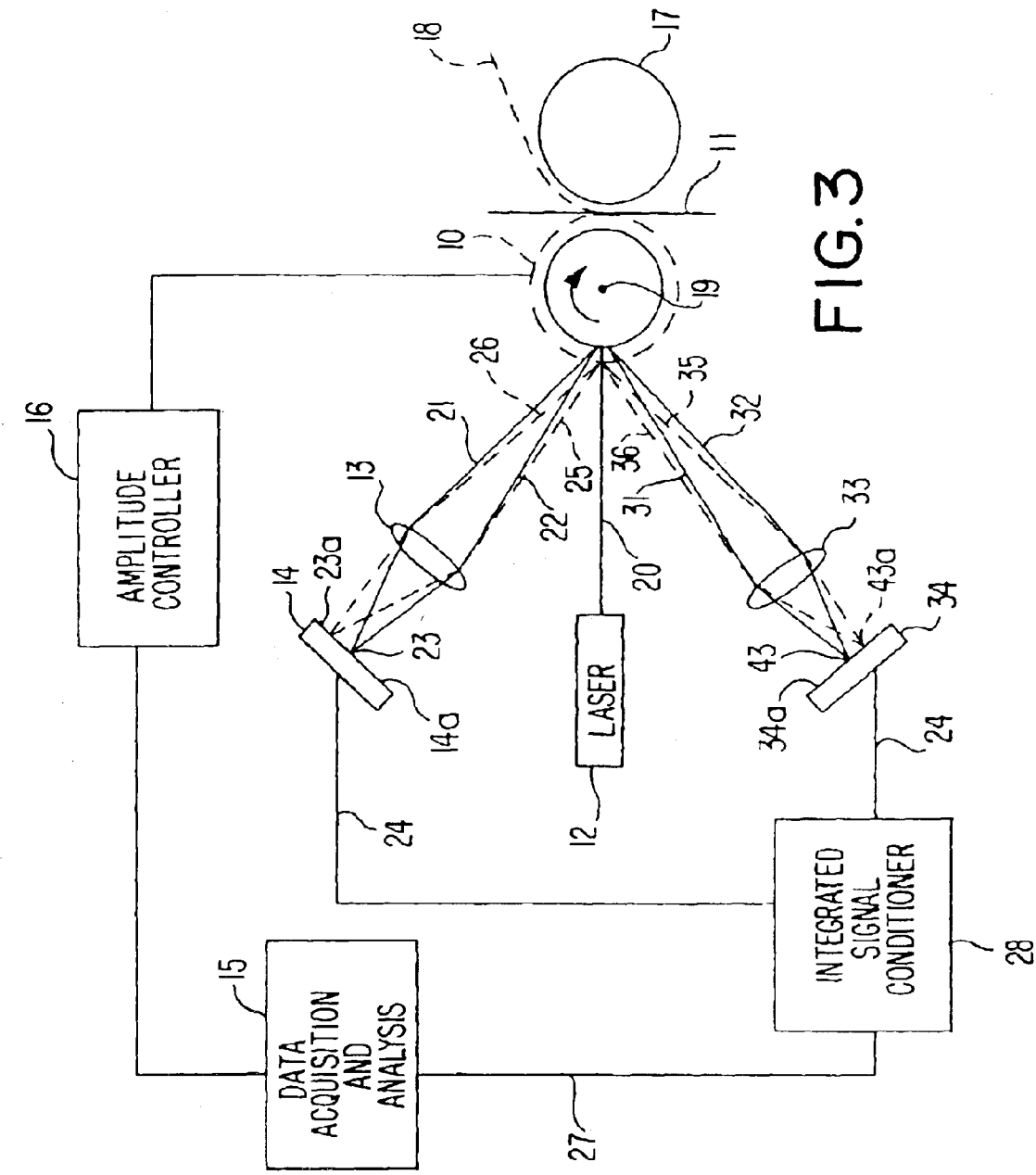
FIG. 3 is a schematic diagram of a system for ultrasonic bonding employing the method for measuring the amplitude of a rotating ultrasonic horn in accordance with a preferred embodiment of this invention.

In accordance with a preferred embodiment of this invention, as shown in FIG. 3, the system of this invention comprises two image systems. The second image system, like the image system described hereinabove, comprises lens 33 and detector 34. Lens 33 is positioned to receive reflected light beams 31, 32 and to project light spot 43 onto detector 34.

The basic principle of operation of the method and system in accordance with one embodiment of this invention is optical triangulation, that is, a system in which a high intensity light beam from a light source such as a laser is used to illuminate an object, the diffusely reflecting surface of which scatters reflections in all directions. A portion of that light enters a lens and is projected as a light spot onto a position sensing detector. As shown in FIG. 3, as rotating ultrasonic horn 10 is displaced during operation, the angle at which light is reflected off the surface of rotating ultrasonic horn 10, designated as dotted lines 25, 26, 35, 36 shifts, thereby shifting the position on detector 14, 34 to point 23a, 43a at which the light spots generated by lenses 13, 33 strike detectors 14, 34. The displacement of the light spot between point 23 and point 23a on detector 14 and point 43 and point 43a on detector 34 correlates to the amplitude of rotating ultrasonic horn 10. Detectors 14, 34 are position sensing detectors, the outputs of which are proportional to the amount of light falling on their surfaces as well as the position of the light spots. In accordance with one preferred embodiment of this invention, light source 12 is a laser.

Figure 4:
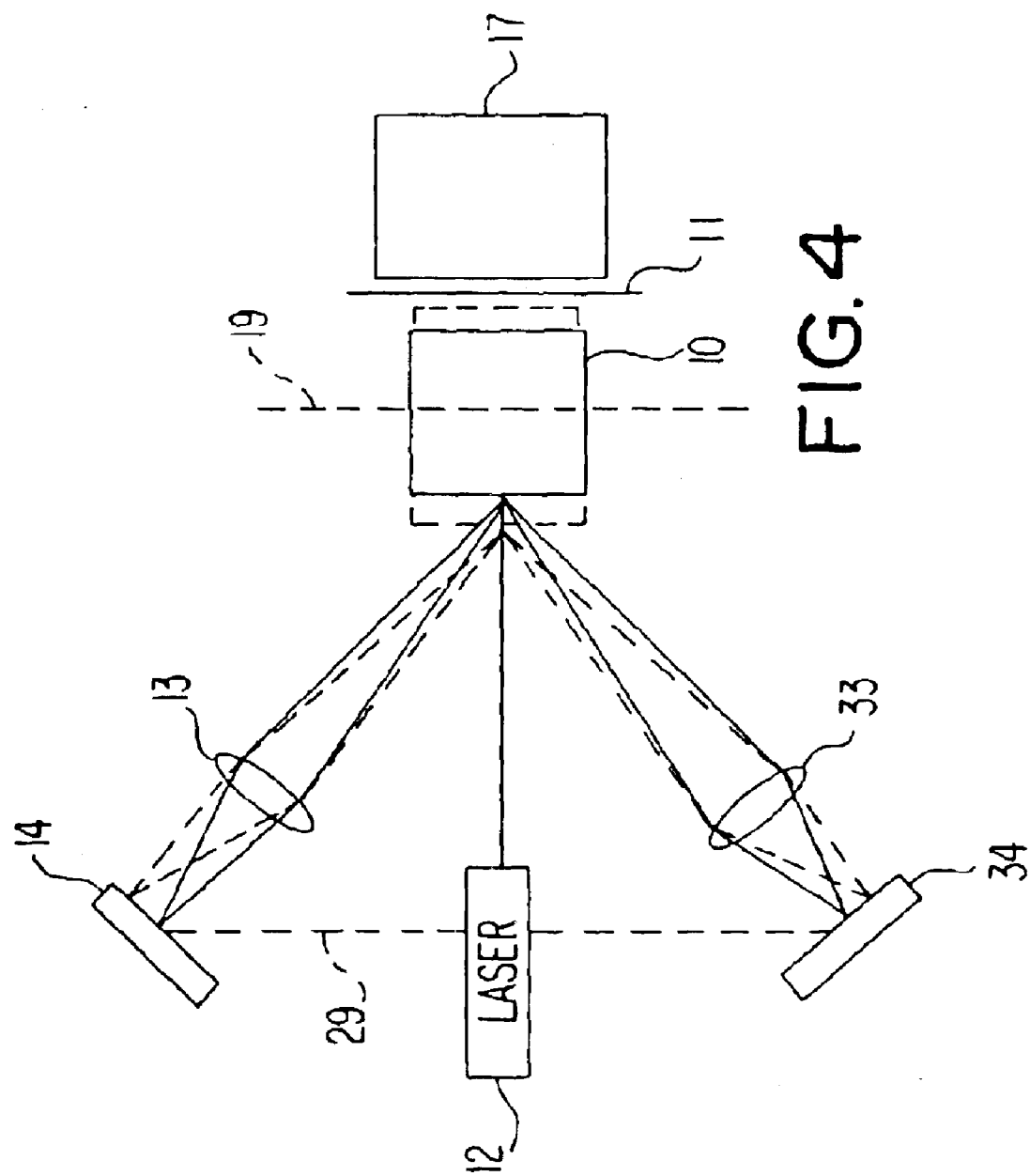
FIG. 4 is a schematic diagram of a top view of a system for ultrasonic bonding employing the method for measuring the amplitude of a rotating ultrasonic horn in accordance with a particularly preferred embodiment of this invention.

The use of two image systems in accordance with one embodiment of this invention effectively increases the total amount of light captured to the imaging options, thereby providing better contour tracking with sharp increases in object height. Due to the compensating effect of position sensing detectors 14, 34 on one another, the lateral sensitivity of the measurements is considerably improved In accordance with a particularly preferred embodiment of this invention, detectors 14 and 34 are in the same plane whereby a line 29 drawn between corresponding points of the detectors is parallel to the axis of rotation of rotating ultrasonic horn 10 (see FIG. 4). In accordance with a preferred embodiment of this invention, detectors 14 and 34 comprise substantially planar detection surfaces 14a and 34a, respectively.

EXAMPLE

A laser displacement sensor system in accordance with FIG. 3 was used to measure the amplitude of a rotating ultrasonic horn 10. The system employed a Dyna Vision® LTS 15/6 laser sensor, available from Dynamic Control Systems, Inc., Delta, BC Canada, to measure the displacement of the surface of rotating horn 10. The sensor was capable of sampling rates up to 500 KHz and had a resolution of 0.016 mils. The standoff of the sensor was 15 millimeters. The system was calibrated by measuring the laser output when the laser was positioned 13, 14, 15, 16 and 17 millimeters from the horn. The wavelength of operation of the laser was 780 nanometers (nm).

Figure 5:
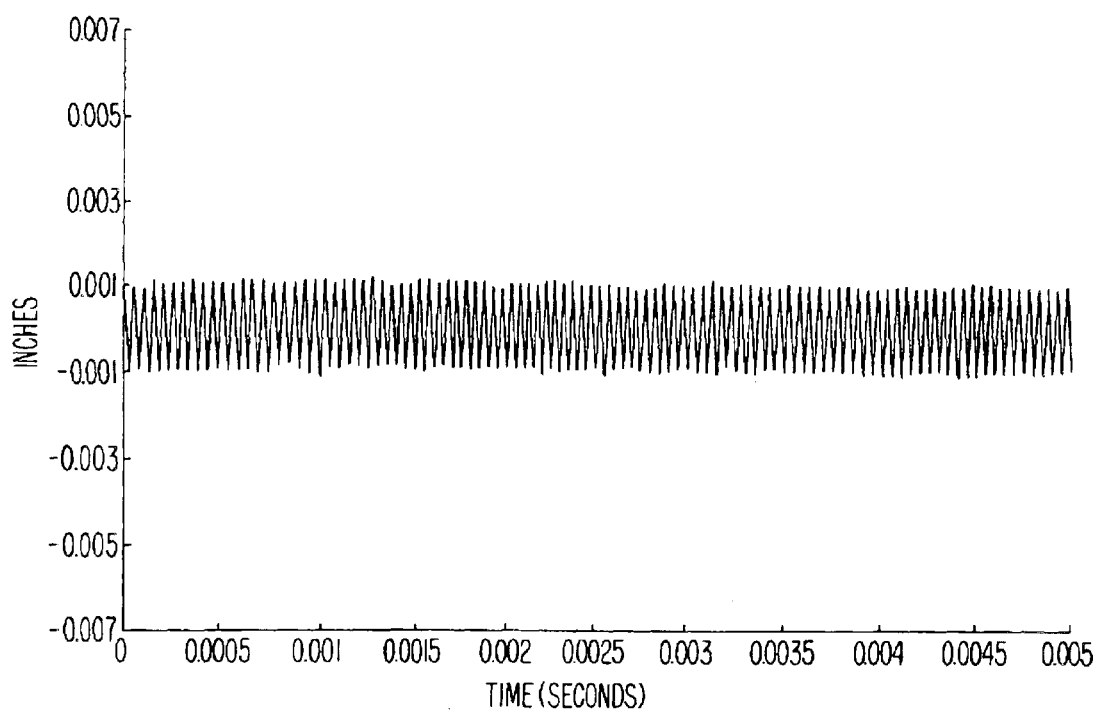
FIG. 5 shows the displacement of a stationary and free ultrasonic horn surface measured in accordance with the method of this invention.
Figure 6:
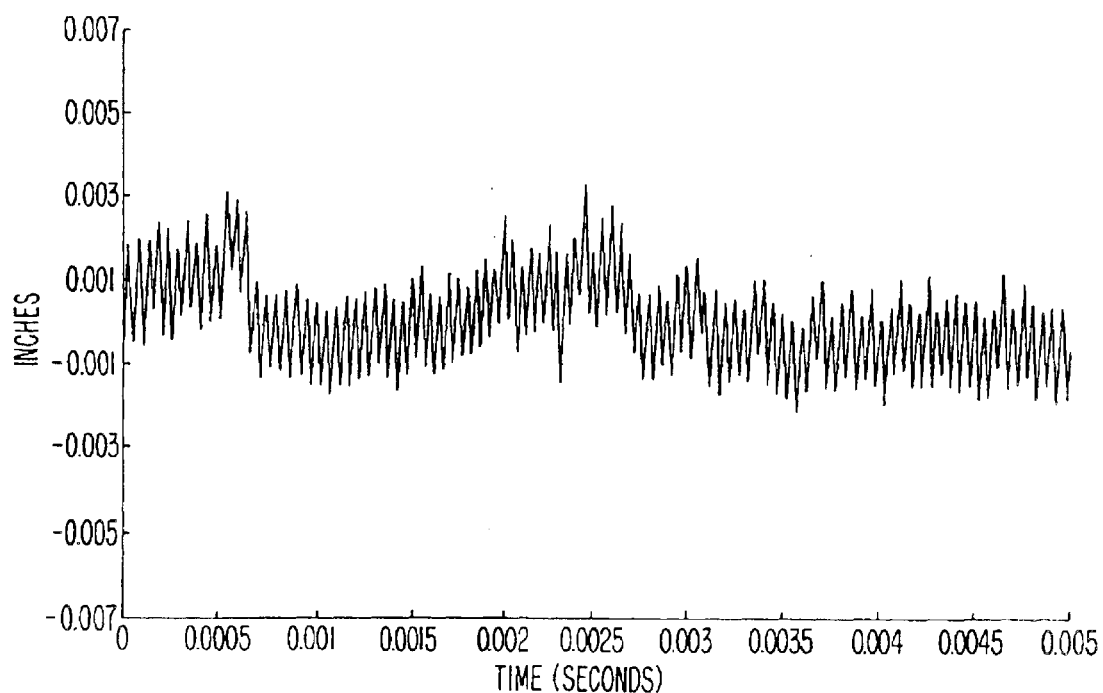
FIG. 6 shows the displacement of a rotating and free horn surface measured in accordance with the method of this invention.
Figure 7:
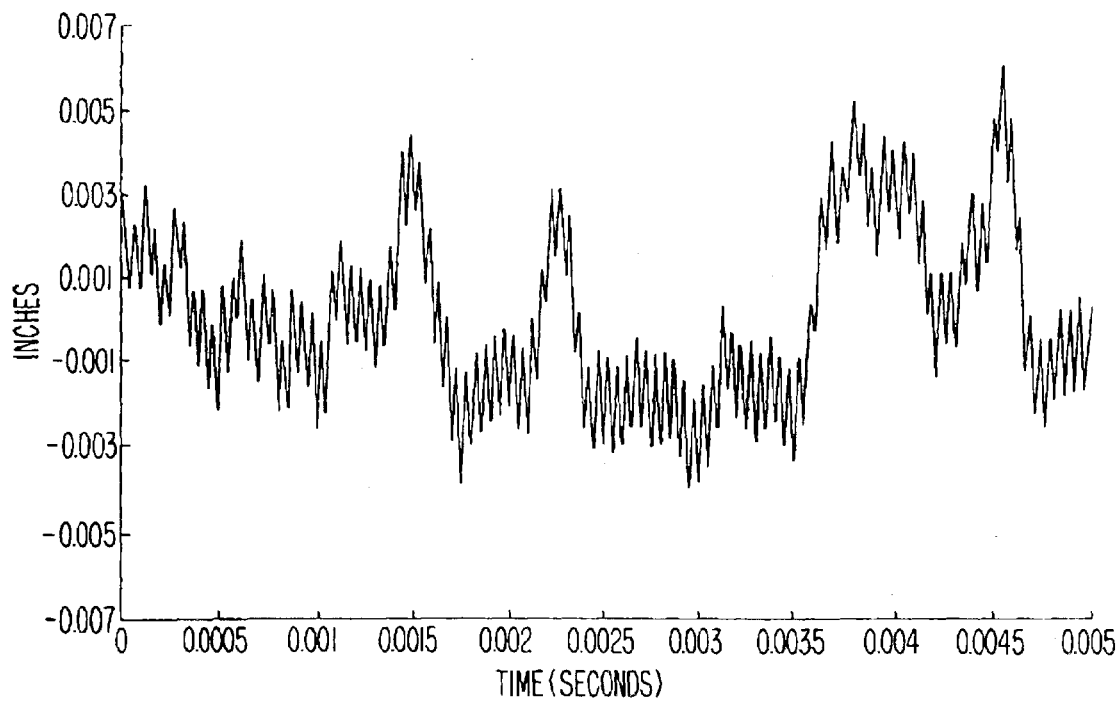
FIG. 7 shows the displacement of horn surface when bonding a spunbond material measured in accordance with the method of this invention.

To determine the ultrasonic amplitude of the horn when it was rotating, the displacement of the horn surface due to run-out had to be filtered from the signal. As shown in FIG. 5, the ultrasonic displacement of the surface of the rotating ultrasonic horn approximates a sine wave at 20,000 Hz. When the horn rotates, the lower frequency horn run-out is added to the ultrasonic surface displacement as shown in FIG. 6. After the horn engages anvil 17 as shown in FIG. 3 and begins bonding of the web material 11, 18, noise is also added to the signal as shown in FIG. 7. A Fast Fourier Transformation was employed to determine the amplitude component of the laser output which was at 20,000 Hz. A similar analysis at the rotational frequency of the horn was also used to determine horn run-out. An HP dynamic signal analyzer (Model HP35670A) available from Hewlett-Packard Company, Englewood, Colo., was used to perform the Fast Fourier Transformation.

Figure 8:
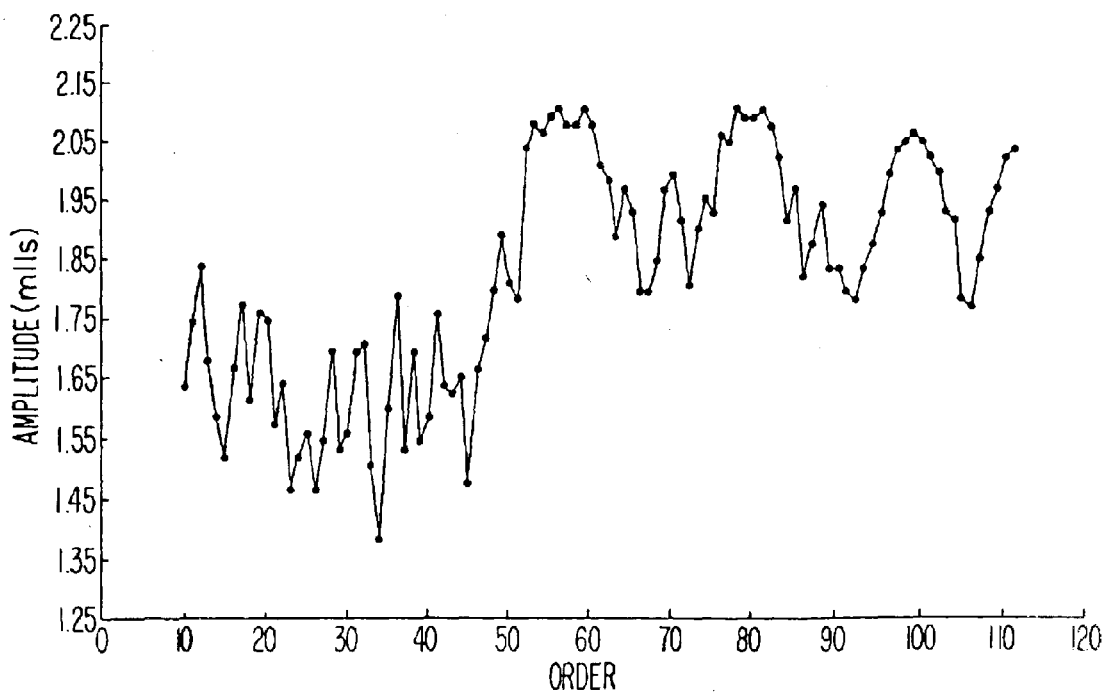
FIG. 8 is a diagram showing the amplitude of the ultrasonic horn surface for a stationary horn, an ultrasonic horn rotating freely, and a rotating ultrasonic horn bonding material.

The laser measurement system of this invention was demonstrated on an ultrasonic pilot line. The amplitude of the rotating ultrasonic horn was measured while bonding a nonwoven web at approximately 200 feet per minute. The amplitude of the laser signal at 20 KHz was measured every 2 seconds while the horn was rotating freely, bonding material, and stationary. FIG. 8 shows the results obtained. Amplitude decreased approximately 0.3 mils when the rotating ultrasonic horn was bonding the nonwoven web material. The short-term oscillations in amplitude were caused by small changes in the ultrasonic frequency of the horn. As the frequency changed, the amplitude of the Fast Fourier Transformation output changed because the analysis was completed at a specific frequency. Measuring total amplitude over a frequency range eliminated this oscillation.

As previously stated, and as shown by the data set forth in FIG. 6, the system of this invention has the capability of measuring not only the amplitude of the horn, but also the lower frequency horn run-out in order to facilitate set up and maintenance of the bonding apparatus. In order to adjust the accuracy of the average amplitude or run-out measured, the data analysis and acquisition system 15 comprises an adjustable filter time constant. By increasing the filter time constant, that is the time period over which amplitude and/or horn run-out are measured, the number of data points increases, providing for a more accurate average.

Figure 9:
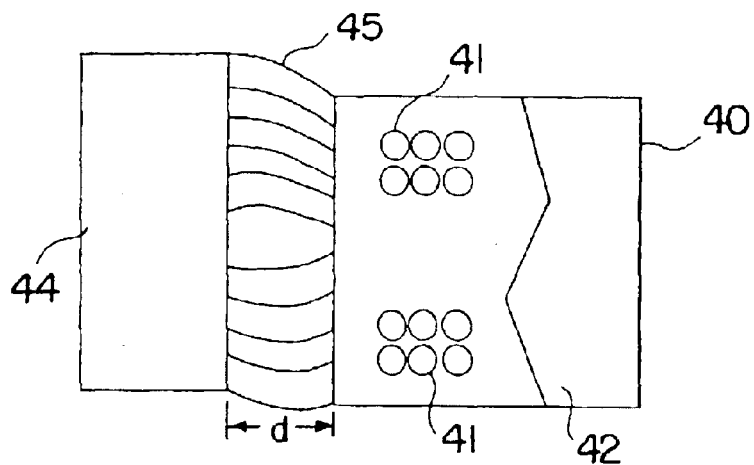
FIG. 9 is a diagram of a non-contact displacement measuring device employing the eddy current principle.
Figure 10:
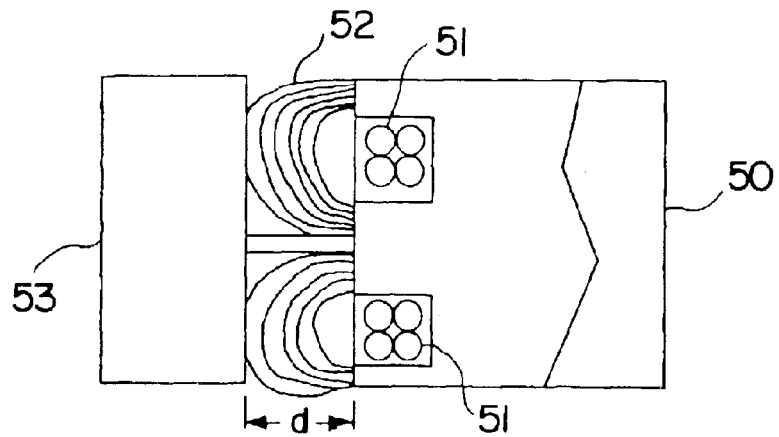
FIG. 10 is a diagram showing a non-contact inductive displacement measuring device.
Figure 11:
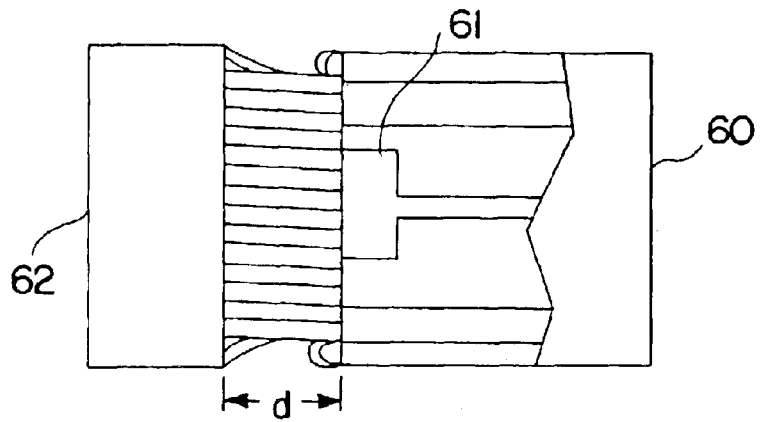
FIG. 11 is a diagram showing a non-contact capacitive displacement measuring device.

FIGS. 9, 10 and 11 show alternative non-contact amplitude sensors suitable for use in this invention, available from Micro Epsilon Co., Raleigh, N.C.

FIG. 9 is a diagram of a non-contact amplitude sensor in accordance with one embodiment of this invention comprising a non-contact displacement measuring device 40 employing the eddy principle. In the operation of this device, high frequency alternating current flows through a coil 41 sealed in a housing 42. The electromagnetic field 45 of the coil 41 induces eddy currents in the conductive target 44, that is the ultrasonic horn, which draws energy from a resonant circuit. The sensor amplitude changes dependent upon the distance, d, between the sensor and the ultrasonic horn. After demodulation, linearization and amplification, this change in amplitude supplies a voltage which is proportional to distance. As a result, an optimum linear relationship between the output signal and the geometrical displacement is achieved.

FIG. 10 is a diagram of a non-contact amplitude sensor in accordance with another embodiment of this invention comprising a non-contact inductive displacement measuring device 50. In this device, a coil 51 is part of a resonant circuit. The inductance 52 of the coil 51 is altered as it approaches a conductive target 53, that is the ultrasonic horn. The demodulated signal is proportional to the distance, d, between the sensor and the ultrasonic horn.

FIG. 11 is a diagram of a non-contact amplitude sensor in accordance with yet another embodiment of this invention comprising a non-contact capacitive displacement measuring device 60. In operation, an ideal plate capacitor changes its capacitance based upon the distance between the plates. With the capacitive measuring technique, the sensor 61 is one plate and the target 62, the ultrasonic horn, forms the other plate. In the measuring device, an alternating current with constant frequency flows through the sensor. The voltage amplitude at the sensor is proportional to the distance, d, between the sensor electrode and the ultrasonic horn and is demodulated and amplified in the data acquisition and analysis system.

Figure 12:
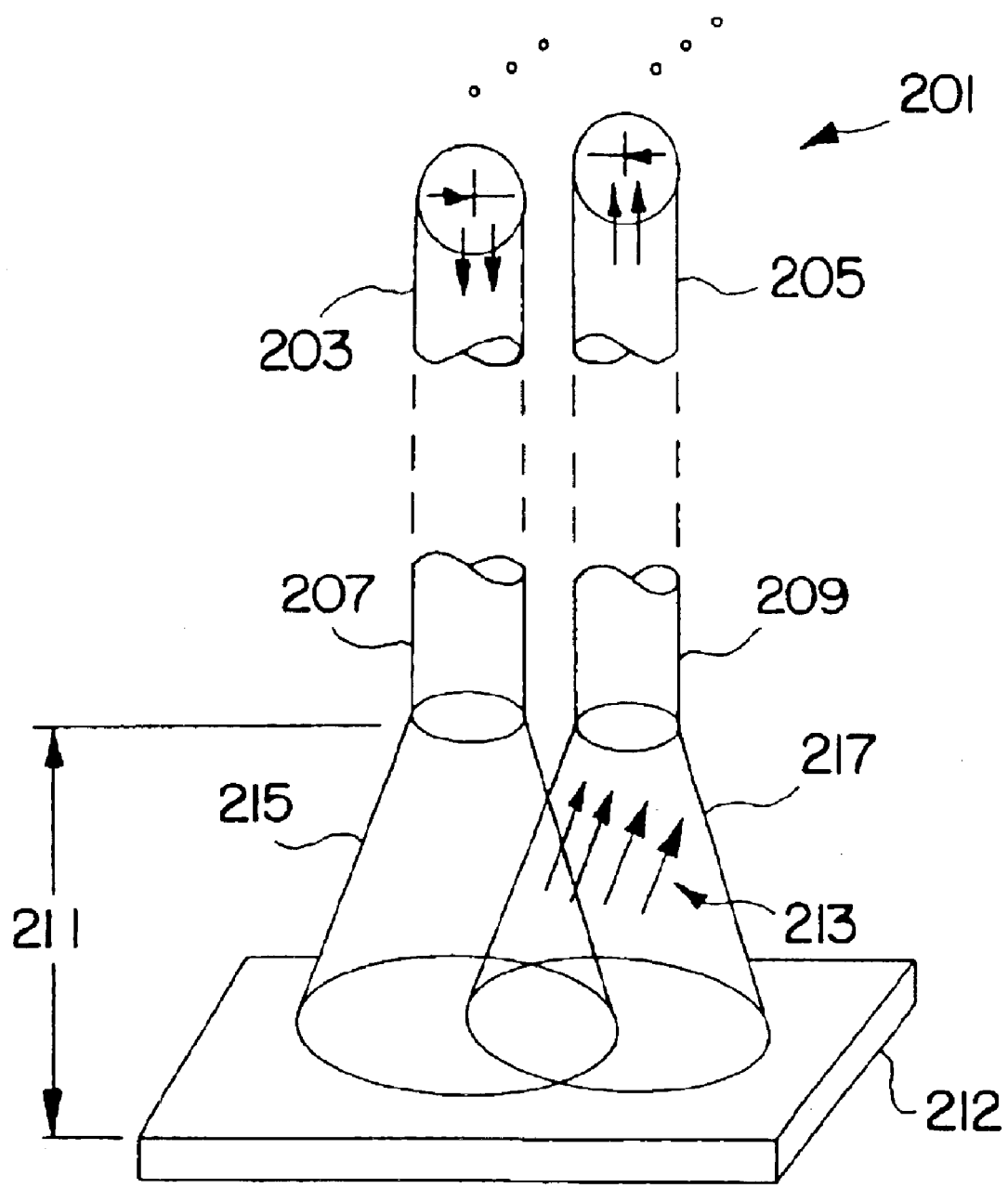
FIG. 12 is a diagram showing the operating principle of the fiber optic displacement sensor used in one embodiment of the present invention.

Referencing FIG. 12, a fiber optic displacement sensor 201 utilizes a light emitter 203, shown as a light emitting diode, or LED, and a light-detector 205 shown as a photo detecting diode, or photodiode. While shown in the Figure as a single pair, it will of course be realized that various sets or groupings of emitters and detectors may be utilized as a part of the fiber optic displacement sensor. Both the emitter and detector are coupled to the environment through optical fibers, respectively 207, 209. Lensing, apart from the optical fibers, may be used in such a system if desired. The fiber optic sensors can utilize non-coherent light of sufficiently high intensity to perform with the present system thus obviating special safety requirements. The fiber optic sensors, with noncoherent, or non-laser, light may also be more economical to operate than a laser-based system. As the distance between the emitter 203 and the target 212 changes, e.g. through horn vibration, the intensity of light reaching the detector will vary, resulting in a varying output signal from the detector. In operation, at a very short, or no, gap 211 between the emitter 203 and the target 212, most of the light exiting the emitter fiber 207 is reflected directly back onto the same emitter fiber resulting in little or no light reaching the detector fiber 209 and hence little or no signal output from the detector. As distance increases from the emitter to the target more light 213 will be reflected to, and captured by, the detector 205. At some point, the entire face of the detector fiber 209 will be illuminated with the majority of a reflected spot of maximum intensity light, producing maximum intensity of light on the detector and thus maximum output signal strength. Further increases in distance will then cause the diverging field of the reflected light 215 to exceed the field of view 217 of the receiving fiber, thus causing a decreased output signal from the detector. The output signal of the fiber optic detector is then fed to appropriate signal conditioners and control apparatus per the above discussion.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A system for ultrasonic bonding comprising:
   an ultrasonic horn in contact with a material to be bonded; and
   non-contact means for measuring an amplitude of said ultrasonic horn;
   said non-contact means including a light source transmitting a high intensity light beam onto a material contacting surface of said ultrasonic horn.

2. A system for ultrasonic bonding comprising:
   an ultrasonic horn in contact with a material to be bonded; and
   non-contact means for measuring an amplitude of said ultrasonic horn; and
   wherein said ultrasonic horn is a rotating ultrasonic horn.

3. A system in accordance with claim 2, wherein said non-contact means comprises a light source disposed perpendicular to an axis of rotation of said rotating ultrasonic horn, said light source transmitting a high intensity light beam onto a material contacting surface of said rotating ultrasonic horn, at least one lens positioned to receive a portion of a plurality of reflected light beams reflected off said material contacting surface and to project said portion of said plurality of reflected light beam as a light spot, at least one detector positioned to detect each said light spot, said at least one detector producing a detector output signal proportional to a strength and a location of each said light spot on said detector, integrated signal conditioning means for conditioning said detector output signal and translation means for converting a light spot displacement on said at least one detector into a horn displacement.

4. A system in accordance with claim 3, wherein said non-contact means comprises two said detectors aligned such that a line drawn between corresponding points of said detectors is parallel to said axis of rotation of said rotating ultrasonic horn.

5. A system in accordance with claim 2, wherein said non-contact means comprises:
   optical fibers including a light emitting optical fiber disposed perpendicular to an axis of rotation of said rotating ultrasonic horn, said light emitting optical fiber transmitting a light beam onto a material contacting surface of said rotating ultrasonic horn;

the optical fibers further including a light receiving optical fiber optically connected to a photodetector and positioned to receive a portion of reflected light reflected off said material contacting surface and transmit the reflected light to the photodetector;

the photodetector producing a detector output signal proportional to an intensity of said light on said detector;

integrated signal conditioning means for conditioning said detector output signal; and translation means for converting a conditioned detector output signal into a horn displacement.

6. A system in accordance with claim 5, wherein said non-contact means comprises two or more of the emitter or the detector optical fibers.

7. A system in accordance with claim 3, wherein said translation means comprises a data acquisition system adapted to receive said output signal from said integrated signal conditioning means and correlate said displacement to said amplitude of said rotating ultrasonic horn.

8. A system in accordance with claim 5, wherein said translation means comprises a data acquisition system adapted to receive said output signal from said integrated signal conditioning means and correlate said displacement to said amplitude of said rotating ultrasonic horn.

9. A system in accordance with claim 1 further comprising control means for directly regulating said amplitude of said ultrasonic horn operably connected to said ultrasonic horn.

10. A system in accordance with claim 2, wherein said light source is a laser.

11. A system in accordance with claim 2, wherein said light source is an LED.

12. A system for directly controlling an amplitude of an ultrasonic horn comprising:

an ultrasonic horn;

non-contact measurement means for directly measuring an amplitude of said ultrasonic horn; and control means for modulating said amplitude of said ultrasonic horn in communication with said non-contact measurement means;

wherein said non-contact measurement means comprises a non-contact amplitude sensor and a data acquisition and analysis system, said data acquisition and analysis system operatively connected to said amplitude sensor and determining an amplitude of said ultrasonic horn; and wherein said ultrasonic horn is a rotating ultrasonic horn.

13. A system in accordance with claim 12, wherein said non-contact amplitude sensor comprises:

a light source for directing a beam of light onto a surface of an ultrasonic horn, thereby generating reflected light;

a photodetector for receiving said reflected light, said detector producing an output signal proportional to at least one of an intensity of said light and a location of said light on said detector;

translating means for correlating said output signal to the amplitude of the ultrasonic horn; and means for adjusting the amplitude of said horn in accordance with said correlated signal.

14. A system in accordance with claim 13, wherein said non-contact means comprises two said detectors aligned such that a line drawn between corresponding points of said detectors is parallel to said axis of rotation of said rotating ultrasonic horn.

15. A system in accordance with claim 13, wherein said data acquisition and analysis system further comprises translation means for converting a displacement of said light beam on said detector into a horn displacement.

16. A system in accordance with claim 13, wherein said non-contact means comprises:

optical fibers including a light emitting optical fiber disposed perpendicular to an axis of rotation of said rotating ultrasonic horn, said light emitting optical fiber transmitting a light beam onto a material contacting surface of said rotating ultrasonic horn;

the optical fibers further including a light receiving optical fiber optically connected to a photodetector and positioned to receive a portion of reflected light reflected off said material contacting surface and transmit the reflected light to the photodetector; and the photodetector producing a detector output signal proportional to an intensity of said light on said detector.

17. A system in accordance with claim 16, wherein said non-contact means comprises two said detectors aligned such that a line drawn between corresponding points of said detectors is parallel to said axis of rotation of said rotating ultrasonic horn.

18. A system in accordance with claim 12, wherein said non-contact amplitude sensor comprises a non-contact displacement measuring device employing the eddy current principle.

19. A system in accordance with claim 12, wherein said non-contact amplitude sensor comprises a non-contact inductive displacement measuring device.

20. A system in accordance with claim 12, wherein said non-contact amplitude sensor comprises a non-contact capacitive displacement measuring device.

21. A system for directly controlling an amplitude of an ultrasonic horn comprising:

an ultrasonic horn;

non-contact measurement means for directly measuring an amplitude of said ultrasonic horn; and control means for modulating said amplitude of said ultrasonic horn in communication with said non-contact measurement means;

wherein said non-contact measurement means comprises a light source for directing a beam of light onto a surface of an ultrasonic horn which contacts a material to be bonded, thereby generating reflected light; and a photodetector for receiving said reflected light.

* * * * *